(12) United States Patent
Su

(10) Patent No.: US 9,048,666 B2
(45) Date of Patent: Jun. 2, 2015

(54) USB CHARGING CIRCUIT

(71) Applicant: CHEN-SOURCE INC., Taoyuan County (TW)

(72) Inventor: Ching-Fang Su, Taoyuan County (TW)

(73) Assignee: CHEN-SOURCE INC., Taoyuan County (TW)

(*) Notice: Subject to any disclaimer, the term of this patent is extended or adjusted under 35 U.S.C. 154(b) by 162 days.

(21) Appl. No.: 13/937,801

(22) Filed: Jul. 9, 2013

(65) Prior Publication Data

US 2015/0015184 A1 Jan. 15, 2015

(51) Int. Cl.
*H02J 7/00* (2006.01)

(52) U.S. Cl.
CPC .................... *H02J 7/0013* (2013.01)

(58) Field of Classification Search
CPC ...................................... H02J 7/0013
USPC .......................................... 320/107
See application file for complete search history.

(56) References Cited

U.S. PATENT DOCUMENTS 6,462,953 B2 * 10/2002 Tong et al. .................... 361/732

* cited by examiner

*Primary Examiner* — Vuthe Siek
(74) *Attorney, Agent, or Firm* — Muncy, Geissler, Olds & Lowe, P.C.

(57) ABSTRACT

A USB charging circuit includes a mating hub module including a USB input port for the connection of an external computer and a USB main hub control circuit electrically connected to the USB input port, a power supply module including a power supply device and a synchronization/charge mode switching circuit for detecting the power signal output of the USB input port and outputting a corresponding mode judgment signal, and one or multiple output control units each including a USB charging control circuit electrically connected to the USB main hub control circuit, the power supply device and the synchronization/charge mode switching circuit to receive the outputted data signal, power supply and mode judgment signal and a USB output port for receiving the outputted data signal and power supply from the USB charging control circuit so that connected portable electronic devices can be charged or receive data synchronously.

5 Claims, 2 Drawing Sheets

USB CHARGING CIRCUIT

BACKGROUND OF THE INVENTION

1. Field of the Invention

The present invention relates to USB chargers and more particularly, to a USB charging circuit, which uses a synchronization/charge mode switching circuit to detect the connection of an external computer, and a USB charging control circuit to control output of power and data to each connected portable electronic device. The USB charging circuit employs a complete hardware logical judgment technique for output control, saving the cost, enhancing charging speed and achieving synchronous multi-port data transmission operation.

2. Description of the Related Art

With fast development of semiconductor manufacturing process and multimedia information technologies, notebook computers, tablet computers, smart phones, PDAs and many other electronic devices have been created having light, thin, short, small and powerful characteristics. Due to the advantages of small size, light weight, high mobility, high application flexibility and practicability and advanced hardware and software configurations, these mobile electronic devices are intensively used to substitute for home computers. Further, the introduction of touch control techniques eliminates the use of complicated operating interface and enables a direct interactive mode to educational systems, such as museum navigation systems, electronic book systems, school education systems and so on.

Further, today information technology is well developed, the learning environment is being constantly changed and improved. In order to satisfy people's desire for knowledge and to improve interactive flexibility in education and learning, data software expansibility of portable electronic devices must be considered.

Further, companies, schools and government or private organizations may purchase a, large amount of portable electronic devices to meet different data classification and software requirements. However, charging a large amount of portable electronic devices that consume different voltages requires a large amount of electrical outlets and voltage converters, complicating the arrangement of power cables and charging systems and the charging operation.

Further, USB interface is the most popularly used connection interface for data transmission and battery charging application. A standard USB port simply provides 500 mA low-current output. Many portable electronic devices can accept 2.1 A charging current. If 500 mA is used to charge a portable electronic device, the charging speed is relatively slow. Further, using a USB port for data update and charging simply allows one-to-one transmission. It will take a lot of time to charge or update a large amount of portable electronic devices.

SUMMARY OF THE INVENTION

The present invention has been accomplished under the circumstances in view. It is the main object of the present invention to provide a USB charging circuit, which eliminates the drawbacks of conventional USB chargers.

According to one aspect of the present invention, the USB charging circuit comprises a mating hub module, a power supply module, and at least one output control unit. The power supply module uses a synchronization/charge mode switching circuit to detect whether or not an external computer is connected to the USB input port of the mating hub module, and then to output a data transmission synchronization or charge mode judgment signal to the USB charging control circuit of each connected output control unit, triggering the USB charging control circuit to control output of data and power to a respective connected mobile electronic device subject to the nature of the mode judgment signal. Thus, if an external computer is connected, a data synchronization mode is executed. If no external computer is connected, a rapid charging mode is executed. Because the USB charging circuit employs a complete hardware logical judgment technique for output control, saving the cost, enhancing charging speed and achieving synchronous multi-port data transmission operation.

Further, the mating hub module comprises a main hub control circuit electrically connected to the USB input port, and at least one USB sub hub control circuit respectively electrically connected to the USB main hub control circuit. Each USB sub hub control circuit has at least one output control unit electrically connected thereto. Using the at least one USB sub hub control circuit to increase the number of pins for data offloading, a large amount of output control units can be installed for charging and synchronous data transmission.

Further, the USB charging circuit of each output control unit uses a current detector to detect the output current of the associating USB output port and to provide a current signal to a LED control circuit of a status display module. The LED control circuit receives the mode judgment signal outputted by the synchronization/charge mode switching circuit, and controls respective LEDs to give off light subject to the detected current signal and operational mode, enabling the user to understand and monitor the data synchronization or charging status of the portable electronic device that is connected to the respective USB output port.

Further, each output control unit of the USB charging circuit uses a current detector to detect the output current of the respective USB output port and to provide the detected current signal to an over-current protection circuit. If the current or temperature is excessively high, the over-current protection circuit immediately provides an over-current protection instruction to the associating USB charging control circuit, driving the respective USB charging control circuit into power-off state to make no voltage output, interrupting output of power supply, and protecting the internal components of the connected portable electronic device(s) against a high breakdown voltage or high temperature and prolonging the lifespan of the USB charging circuit and the connected portable electronic device(s).

DETAILED DESCRIPTION OF THE PREFERRED EMBODIMENT

Figure 1:
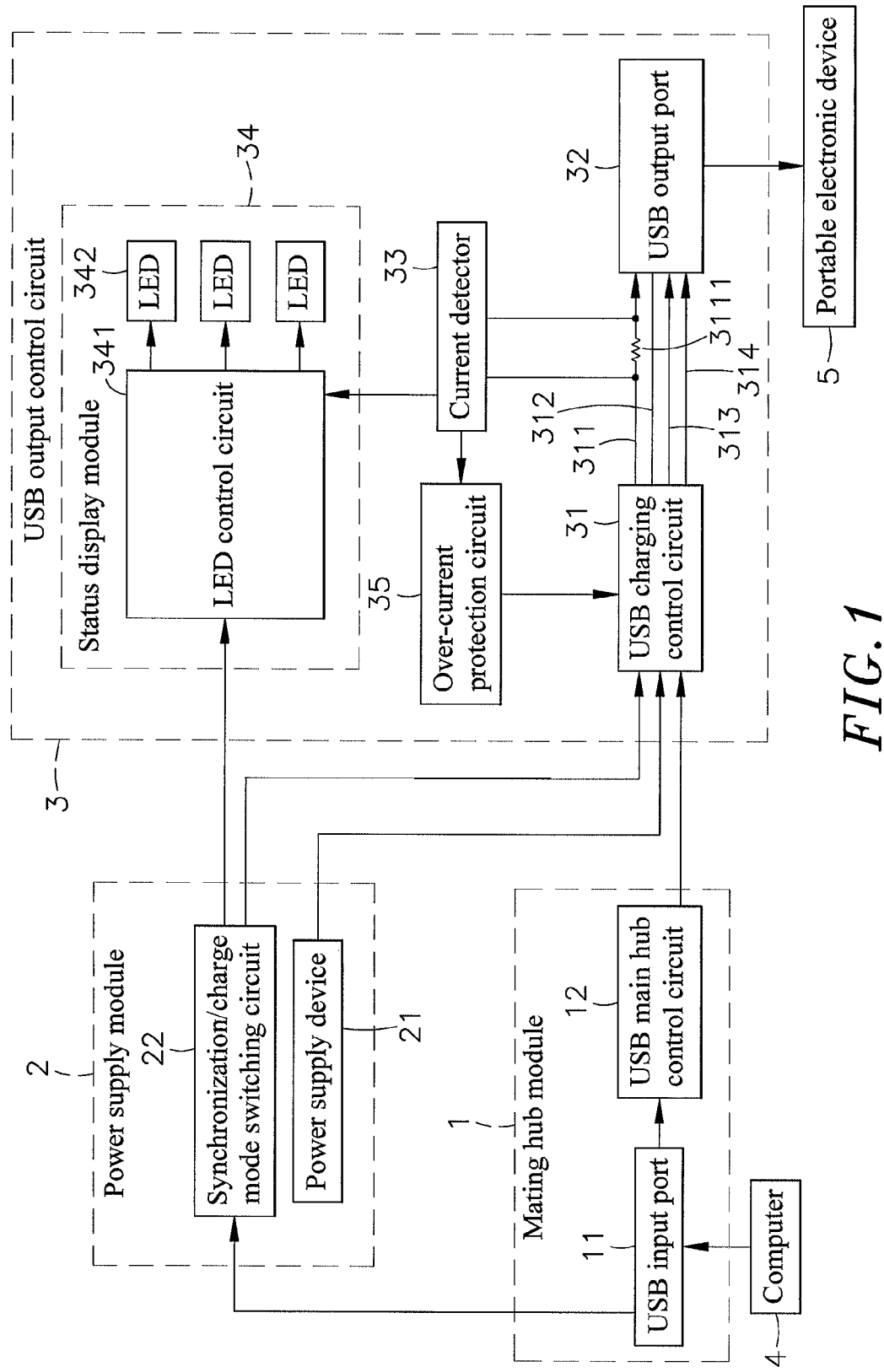
FIG. 1 is a circuit block diagram of a USB charging circuit in accordance with a first embodiment of the present invention.

Referring to FIG. 1, a USB charging circuit in accordance with the present invention is shown. The USB charging circuit comprises a mating hub module 1, a power supply module 2, and at least one output control unit 3.

The mating hub module 1 comprises a USB input port 11 for receiving a data signal and a power signal (for example, 5V) from an external computer 4, and a USB main hub control circuit 12 electrically connected to the USB input port 11 for receiving the data signal from the USB input port 11.

The power supply module 2 comprises a power supply device 21, and a synchronization/charge mode switching circuit 22 electrically connected to the USB input port 11 of the mating hub module 1 and adapted to detect the output of the power signal (for example, 5V) out of the USB input port 11 and to output a corresponding mode judgment signal.

The at least one output control unit 3 each comprises a USB charging control circuit 31 electrically connected to the USB main hub control circuit 12, the power supply device 21 and the synchronization/charge mode switching circuit 22 and adapted to receive the outputted data signal from the USB main hub control circuit 12, the outputted power supply from the power supply device 21 and the outputted mode judgment signal from the synchronization/charge mode switching circuit 22, and a USB output port 32 electrically connected to the USB charging control circuit 31 and adapted to receive the data signal and power supply outputted by the USB charging control circuit 31 after logical judgment. The power signal received by the USB input port 11 from an external computer 4 and transmitted by the USB input port 11 to the synchronization/charge mode switching circuit 22 in this embodiment is 5V, which can be dropped due to electrical connection, or changed subject to installation of a buck-booster circuit. This power signal works as switch means, enabling the synchronization/charge mode switching circuit 22 to determine the connection of an external computer 4 to the USB input port 11, therefore this power signal is not limited to 5V.

Figure 2:
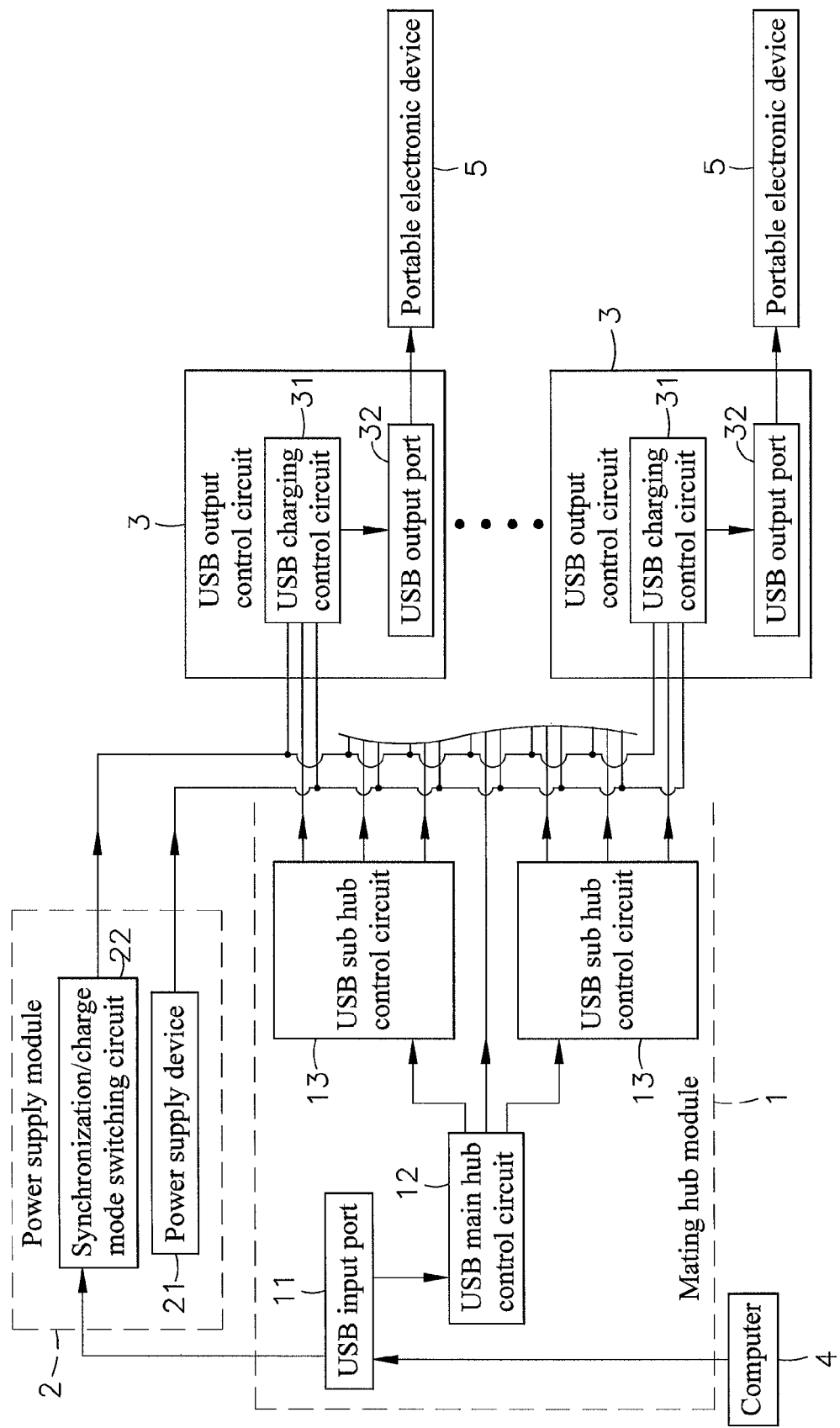
FIG. 2 is a circuit block diagram of an alternate form of the USB charging circuit in accordance with the present invention.

Referring to FIG. 2, an alternate form of the USB charging circuit in accordance with the present invention is shown. According to this alternate form, the mating hub module 1 comprises at least one USB sub hub control circuit 13 respectively electrically connected to the USB main hub control circuit 12. Each USB sub hub control circuit 13 is electrically connected to at least one of the aforesaid at least one output control unit 3, and adapted for data offloading to expand the connected number of output control units 3, allowing a large amount of mobile electronic devices to be connected to the USB output ports 32 of multiple output control units 3 for charging and synchronous data transmission. Therefore, the invention allows expansion of the connection capacity to fit different user requirements. In one example of the present invention, one USB main hub control circuit 12 is electrically connected to the USB input port 11 for data transmission; the USB main hub control circuit 12 has three output ports. One output port of the USB main hub control circuit 12 is electrically connected to one respective output control unit 3 for data transmission; the other two output ports of the USB main hub control circuit 12 each are electrically connected to one respective USB sub hub control circuit 13 for data transmission; each USB sub hub control circuit 13 is electrically connected to the USB charging control circuits 31 of three output control units 3; the USB charging control circuit 31 of each output control unit 3 is respectively electrically connected to one respective USB output port 32; therefore, there are totally 7 USB output ports 32 in this example for the connection of 7 portable electronic devices for synchronous data transmission and battery charging. However, it is to be understood that the number of the USB main hub control circuit 12, the number of the USB sub hub control circuit 13 and the number of the USB output port 32 are not limited to the aforesaid example.

Referring to FIG. 1 again, during actual application of the present invention, at least one portable electronic device can be respectively electrically connected to the USB output port 32 of one respective output control unit 3. Further, when an external computer 4 is electrically connected to the USB input port 11 of the mating hub module 1, the USB charging circuit will be triggered to enter data synchronization mode. At this time, the external computer 4 enter outputs a data signal and a power signal to the USB input port 11 of the mating hub module 1, enabling the USB input port 11 to output the power signal to the synchronization/charge mode switching circuit 22 of the power supply module 2. Upon receipt of the power signal from the USB input port 11, the synchronization/charge mode switching circuit 22 provides a data transmission synchronization mode judgment signal to the USB charging control circuits 31 of each output control unit 3. At the same time, the USB charging control circuits 31 of each output control unit 3 also receives the power supply from the power supply device 21 and the data signal from the USB input port 11 through the USB main hub control circuit 12. Thus, the USB charging control circuit 31 of each output control unit 3 output the received data signal and low-current power supply (for example, 5V-500 mA) to the associating USB output port 32, enabling each connected portable electronic device to receive the data signal and to run a data synchronization operation. Further, during the data synchronization operation, the low-current power supply is also transmitted to each portable electronic device to extend the operating time of each portable electronic device.

The low-current power supply transmitted by the USB charging control circuit 31 of each output control unit 3 to the associating USB output port 32 is 5V-500 mA in this example. This low-current power supply is subject to the acceptable rated voltage and current of the portable electronic devices that are connected to the USB output ports 32 of the output control units 3 for synchronous data transmission. The output voltage and current of USB charging control circuit 31 can be changed by means of circuit design. Therefore, the voltage and current of the low-current power supply are not limited to 5V-500 mA.

If only at least one portable electronic device is connected to the USB output port 32 of one respective output control unit 3 and no external computer 4 is connected to the USB input port 11 of the mating hub module 1, the USB charging circuit will be triggered to enter a charging mode. At this time, the USB input port 11 of the mating hub module 1 provides no power signal to the synchronization/charge mode switching circuit 22, the synchronization/charge mode switching circuit 22 provides a charge mode judgment signal to the USB charging control circuit 31 of each output control unit 3. At the same time, the USB charging control circuit 31 of each output control unit 3 receives power supply from the power supply device 21. Thus, the USB charging control circuit 31 of each output control unit 3 outputs high-current power supply (for example, 5V-2.1 A) to the associating USB output port 32, enabling each connected portable electronic device to receive the data signal and to be electrically charged.

The high-current power supply transmitted by the USB charging control circuit 31 of each output control unit 3 to the associating USB output port 32 is 5V-2.1 A in this example. This high-current power supply is subject to the acceptable rated voltage and current of the portable electronic devices that are connected to the USB output ports 32 of the output control units 3 for synchronous data transmission. The output voltage and current of USB charging control circuit 31 can be changed by means of circuit design. Therefore, the voltage and current of the high-current power supply are not limited to 5V-2.1 A.

Further, every USB charging control circuit 31 and the associating USB output port 32 are electrically connected by means of a power line 311, a grounding line 312, a high-potential data signal line 313 and a low-potential data signal line 314. The power line 311 has a resistor 3111 electrically connected thereto in series. The two opposite ends of the resistor 3111 are electrically connected to a current detector 33 adapted to detect the amount of current of the power line 311. The current detector 33 is electrically connected to a status display module 34. The status display module 34 comprises a LED control circuit 341 adapted to receive the detected current signal from the current detector 33 and the mode judgment signal from the synchronization/charge mode switching circuit 22, and a plurality of light-emitting diodes (LEDs) 342 respectively electrically connected to the LED control circuit 341 for receiving charge/synchronization status display instructions from the LED control circuit 341.

In this embodiment, the multiple LEDs 342 are selectively controlled to give off light, enabling the user to conveniently and rapidly know and monitor the data synchronization or charge status of the portable electronic devices that are connected to the respective USB output ports 32. Thus, the invention improves the convenience of using the USB charging circuit. The multiple LEDs 342 can be designed to fit the operation of the LED control circuit 341 and user's requirements. For example, the multiple LEDs 342 include one red LED, one green LED and one orange LED. When an external computer 4 is connected to the USB input port 11 to perform data synchronization transmission, the red LED is turned on constantly. When the current detector 33 detects the current being outputted to the connected portable electronic device(s) is below a predetermined first threshold value (for example, 0.1 A or 0.2 A), the green LED is turned on constantly, indicating that the charge has completed. When the current detector 33 detects the current being outputted to the connected portable electronic device(s) is below a predetermined second threshold value (for example, 2.3 A or 2.4 A), the orange LED is turned on constantly, indicating the USB charging circuit is undergoing charging. When the current detector 33 detects the current being outputted to the connected portable electronic device(s) is above the predetermined second threshold value, the red LED is driven to flash, indicating the USB charging circuit is undergoing an over current protection operation. However, it is to be noted that this LED control circuit operational design is simply an example but not intended to address a functional limitation of the present invention.

Further, when an external computer 4 is connected is electrically connected to the USB input port 11 and outputs a power signal to the USB input port 11, which in turn outputs the power signal to control the synchronization/charge mode switching circuit 22 to provide a data transmission synchronization mode judgment signal to the USB charging control circuits 31, in this way the USB charging control circuits 31 is triggered to switch to synchronization mode. Hence, the output of the USB charging circuit is subject to a complete hardware logical judgment. Such a control minimizes the current noise level, and avoids interference shutdown or abnormal signaling of the LEDs 342 of the status display module 34.

The multiple LEDs 342 of the status display module 34 can be configured to give off green light, red light, orange light, blue light, yellow light, purple light, white light, or any other color of light. Further, the multiple LEDs 342 can also be controlled to give off multiple colors of light. Further, each individual LED 342 can be controlled to give off light constantly, to flash once shortly at every time interval, to flash shortly and several times at every time internal, to flash at different flashing lengths at every time interval, or to flash different colors for indicating different operational status (for example, flashing white light shortly or flashing blue light at different flashing lengths at every time interval during data synchronization transmission). Thus, the status display module 34 can be variously configured to give different visual indications of different operation status without departing from the spirit and scope of the invention.

Preferably, the current detector 33 of each output control unit 3 has an over-current protection circuit 35 electrically connected thereto. The over-current protection circuit 35 is electrically connected to the associating USB charging control circuit 31, and adapted to receive an over-current judgment signal from the current detector 33 and to control the power output of the associating USB charging control circuit 31 subject to the over-current judgment signal. The over-current protection circuit 35 has a threshold value set therein. When the detected current signal from the current detector 33 surpasses the set threshold value, or when the temperature is excessively high (surpasses a predetermined temperature value), the over-current protection circuit 35 immediately provides an over-current protection instruction to the associating USB charging control circuit 31, driving the associating USB charging control circuit 31 into power-off state to make no voltage output, interrupting output of power supply, and protecting the USB charging circuit and the connected portable electronic device(s) and prolonging their lifespan.

In conclusion, the USB charging circuit in actual application has the advantages and features as follows:

1. The synchronization/charge mode switching circuit 22 detects power signal to make sure whether or not an external computer 4 is connected to the USB input port 11, and then outputs a data transmission synchronization or charge mode judgment signal to the USB charging control circuit 31 of each output control unit 3 through the synchronization/charge mode switching circuit 22 for power and data signal output control. When an external computer 4 is connected to the USB input port 11, the data transmission synchronization mode is executed to charge the connected portable electronic device with a low-current power supply and to provide the data signal to the connected portable electronic device. If no externally computer 4 is connected to the USB input port 11, the charge mode is executed to charge the connected portable electronic device rapidly. The USB charging circuit eliminates the use of a MCU and employs a complete hardware logical judgment technique for output control, saving the cost, enhancing charging speed and achieving synchronous multi-port data transmission operation.

2. The mating hub module 1 comprises at least one USB sub hub control circuit 13 respectively electrically connected to the USB main hub control circuit 12, and each USB sub hub control circuit 13 has at least one output control unit 3 electrically connected thereto; using the at least one USB sub hub control circuit 13 to increase the number of pins for data offloading, a large amount of output control units 3 can be installed for charging and synchronous data transmission.

3. The USB charging circuit uses a current detector 33 in each output control unit 3 to detect the output current of the associating USB output port 32 and to provide a current signal to the LED control circuit 341 of the associating status display module 34; further the LED control circuit 341 receives the mode judgment signal outputted by the synchronization/charge mode switching circuit 22, and controls the associating LEDs 342 to give off light subject to the detected current signal and operational mode, enabling the user to knows and monitor the data synchronization or charging status of the portable electronic device that is connected to the associating USB output port 32.

4. The USB charging circuit uses a current detector 33 in each output control unit 3 to detect the output current of the associating USB output port 32 and to provide the detected current signal to an over-current protection circuit 35; if the current or temperature is excessively high, the over-current protection circuit 35 immediately provides an over-current protection instruction to the associating USB charging control circuit 31, driving the associating USB charging control circuit 31 into power-off state to make no voltage output, interrupting output of power supply, and protecting the internal components of the connected portable electronic device(s) against a high breakdown voltage or high temperature and prolonging the lifespan of the USB charging circuit and the connected portable electronic device(s).

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A USB charging circuit comprising:
a mating hub module comprising a USB input port for receiving a data signal and a power signal from an external computer, and a USB main hub control circuit electrically connected to said USB input port for receiving said data signal from said USB input port;
a power supply module comprising a power supply device, and a synchronization/charge mode switching circuit electrically connected to said USB input port of said mating hub module and adapted to detect the output of said power signal out of said USB input port and to output a corresponding mode judgment signal; and
at least one output control unit, each said output control unit comprising a USB charging control circuit electrically connected to said USB main hub control circuit, said power supply device and said synchronization/charge mode switching circuit and adapted to receive the outputted data signal from said USB main hub control circuit, the outputted power supply from said power supply device and the outputted mode judgment signal from said synchronization/charge mode switching circuit, and a USB output port electrically connected to said USB charging control circuit and adapted to receive the data signal and power supply outputted by said USB charging control circuit after logical judgment.

2. The USB charging circuit as claimed in claim 1, wherein the power signal outputted by said USB input port of said mating hub module is 5V.

3. The USB charging circuit as claimed in claim 1, wherein said mating hub module further comprises at least one at least one USB sub hub control circuit respectively electrically connected in series between said USB main hub control circuit and at least one of said at least one output control unit.

4. The USB charging circuit as claimed in claim 1, wherein each said output control unit further comprising a power line, a grounding line, a high-potential data signal line and a low-potential data signal line respectively electrically connected between the USB charging control circuit and USB output port thereof, a resistor electrically connected to said power line in series, a current detector electrically connected to two opposite ends of said resistor for detecting the amount of current passing through said power line, and a status display module electrically connected to said current detector, said status display module comprising a LED control circuit adapted to receive the detected current signal from said current detector and the mode judgment signal from said synchronization/charge mode switching circuit, and a plurality of light-emitting diodes respectively electrically connected to said LED control circuit for receiving charge/synchronization status display instructions from said LED control circuit.

5. The USB charging circuit as claimed in claim 1, wherein each said output control unit further comprising a power line, a grounding line, a high-potential data signal line and a low-potential data signal line respectively electrically connected between the USB charging control circuit and USB output port thereof, a resistor electrically connected to said power line in series, a current detector electrically connected to two opposite ends of said resistor for detecting the amount of current passing through said power line, and an over-current protection circuit having an input end thereof electrically connected to said current detector and an output end thereof electrically connected to said USB charging control circuit for receiving an over-current judgment signal from said current detector and controlling the power output of said USB charging control circuit subject to said over-current judgment signal.

* * * * *